United States Patent
Knapp et al.

(10) Patent No.: US 8,204,292 B2
(45) Date of Patent: Jun. 19, 2012

(54) FEATURE BASED NEURAL NETWORK REGRESSION FOR FEATURE SUPPRESSION

(75) Inventors: Jason Knapp, Miamisburg, OH (US); Steve Worrell, Springborgo, OH (US)

(73) Assignee: Riverain Medical Group, LLC, Miamisburg, OH (US)

( * ) Notice: Subject to any disclaimer, the term of this patent is extended or adjusted under 35 U.S.C. 154(b) by 846 days.

(21) Appl. No.: 12/246,130

(22) Filed: Oct. 6, 2008

(65) Prior Publication Data

US 2009/0290779 A1    Nov. 26, 2009

Related U.S. Application Data

(60) Provisional application No. 61/054,908, filed on May 21, 2008.

(51) Int. Cl.
*G06K 9/00* (2006.01)
(52) U.S. Cl. .................................................... 382/132
(58) Field of Classification Search ............... 378/4, 19, 378/37, 62, 901; 382/128, 130–132
See application file for complete search history.

(56) References Cited

U.S. PATENT DOCUMENTS

| | | | | |
|---|---|---|---|---|
| 6,282,305 | B1 * | 8/2001 | Huo et al. | 382/128 |
| 2002/0094113 | A1 * | 7/2002 | Shinbata | 382/128 |
| 2008/0205717 | A1 * | 8/2008 | Reeves et al. | 382/128 |

OTHER PUBLICATIONS

Kenji Suzuki, et al.; "Image-Processing Technique for Suppressing Ribs in Chest Radiographs by Means of Massive Training Artificial Neural Network (MTANN)"; IEEE Transactions on Medical Imaging, vol. 25, No. 4, Apr. 2006.
M. Loog et al.; "Filter learning: Application to suppression of bony structures from chest radiographs"; Science Direct; Medical Image Analysis 10 (2006), pp. 826-840.

* cited by examiner

*Primary Examiner* — Irakli Kiknadze
(74) *Attorney, Agent, or Firm* — Connolly Bove Lodge & Hutz LLP

(57) ABSTRACT

A method of obtaining one or more components from an image may include normalizing and pre-processing the image to obtain a processed image. Features may be extracted from the processed image. Neural-network-based regression may then be performed on the set of extracted features to predict the one or more components. These techniques may be applied, for example, to the problem of extracting and removing bone components from radiographic images, which may be thoracic (lung) images.

49 Claims, 4 Drawing Sheets

FEATURE BASED NEURAL NETWORK REGRESSION FOR FEATURE SUPPRESSION

CROSS-REFERENCE TO RELATED APPLICATION

This application is a non-provisional patent application deriving priority from U.S. Provisional Patent Application No. 61/054,908, filed on May 21, 2008, and incorporated by reference herein.

BACKGROUND

The detection and localization, segmentation, of objects in images, both two dimensional and three dimensional, is commonly complicated by noise (both random and structured) and partial obscuration of objects of interest. The detection of lung nodules, as well as other pathologies and objects of interest, whether based on computer aided detection (CAD) or human observers, in chest radiographs is challenging. The detection and/or localization of other pathologies and objects of interest (e.g., catheters, feeding tubes, etc) in chest radiographs, particularly portable chest x-rays, is challenging and perhaps one the most difficult interpretation tasks in radiology. Such difficulties may arise due to, for example, one or more of the following factors: poor patient positioning, imaging area and habitués, image latitude and dynamic range, poor x-ray penetration, and perhaps most significantly, the presence of obscuring bones. The presence of the bone can lead to false diagnosis, false positives (FPs), false negatives and/or improper positioning of catheters and feeding tubes. These difficulties may arise due to the projection of a three dimensional object onto a two dimensional image. In lung nodule detection, in particular, false positives can arise from areas in the chest image where one rib crosses another or crosses another linear feature. Similarly, the clavicle bones crossing the ribs is another source of FPs. Even more significantly, overlapping bone may obscure the area underneath, resulting in a prominent source of false negatives. Furthermore, the profile of the nodule and/or other relevant pathologies or structures (e.g., catheters), may be modified by the overlaying rib, which may result in more difficult interpretation tasks for both machines and practitioners.

Several attempts have been made to solve this problem. In the context of CAD, the approach by Kenji Suzuki at University of Chicago is probably the most advanced. However, this has been achieved in an academic environment where tuning of the algorithm parameters can be made to fit the characteristics of the sample set. The particular method is based on a pixel-based artificial neural net that calculates a subtraction value for each pixel in the image based on the degree of bone density detected by the network. The result can be noisy, and the example implementation only worked for bones away from the outer part of the lung field. Based on the information provided in a paper by Suzuki, very little can be said about the performance of the approach; however, several inferences can be made. First, the method does not use a feature extraction process. This means that the method may not perform well on data that does not look very similar to its training images. Without feature extraction, a smooth approximation (good interpolation) is much harder to achieve. A second observation is that the method uses a rather simplistic approach for image normalization. Again, this implies that the approach may be susceptible to being too particular to its training images. This is not to suggest that the technique will altogether fail, but only that it is more difficult to be confident in later predictions. The authors have framed the algorithm as subtracting a weighted version of the predicted bone image (i.e., the subtraction values discussed above) from the original image. Therefore, by making this weight ever so smaller, one is simply moving more toward the posterior-anterior (PA) image rather than the desired soft tissue image. A final shortcoming is that the method explicitly leaves out the opaque area of the lung-field.

Loog, van Ginneken and Schilham published an approach in 2006 for suppressing bone structures based on feature extraction and local regression. The method works by first normalizing the image with an iterative application of local-contrast enhancement. This is followed by a feature extraction process, where the features are Gaussian 3-jets (a set of Gaussian derivatives at multiple scales up to order 3). This generates many features, and as a result, the authors employ a dimensionality reduction technique. The technique used is based on performing principle component analysis (PCA) on local regression coefficients. The authors use K-nearest neighbors regression (KNNR) for prediction of either the soft-tissue or bone images, possibly with an iterative application using the initial prediction as an additional feature. This approach would appear to have two major shortcomings: the first is that the prediction phase is entirely too computationally intensive and is likely inadequate. The second is that the approach for image normalization is likely grossly inadequate. KNNR is known as a "lazy learner," which means that it uses proximity to training data as a means of making predictions. Unfortunately, even at a coarse resolution, a few images can generate many pixels (large training set). Therefore, for the routine to be even remotely practical, it would require a very sparse sampling of the training images. However, sparse sampling of training images could lead to issues in prediction, as nearest neighbor methods are notoriously bad interpolators. This would require a large value of K to compensate; however, too large a value of K leads to overly smoothed predictions (which would appear to be the case based on the images presented in the paper). Furthermore, the approach to image normalization is aimed at adjusting for gross global differences, while preserving and enhancing local details. The authors do this by iteratively applying a local contrast enhancement step. This step is potentially brittle in the presence of large non-anatomical artifacts (e.g., pacemakers) and allows for content outside the lung-field to have a heavy influence on pixel values inside. The latter point is important because content outside the lung-field can be highly variable (e.g., the presence of tags and markers).

SUMMARY OF THE INVENTION

Various embodiments of the invention may address the use of neural network-based regression techniques for the suppression of bones in radiographic images. Some embodiments may be directed to chest radiographs. Various embodiments may take the form(s) of, for example, apparatus, method, hardware, software, and/or firmware.

BRIEF DESCRIPTION OF THE DRAWINGS

Various embodiments of the invention will now be described in conjunction with the accompanying drawings, in which.

DETAILED DESCRIPTION OF EXEMPLARY EMBODIMENTS OF THE INVENTION

The developed bone suppression technique according to various embodiments of the invention may use dual energy (DE) data to generate a regression model for predicting the bone image. Along with a regression model that may be based on a set of robust, extracted features, the regression model may use a multi-layer perceptron (MLP) neural network architecture. Multiple feature representations may be used. Particular features may include, for example, in an exemplary embodiment of the invention:

- A 5 scale (redundant) wavelet decomposition using a third-order basic spline (B-spline) wavelet (this may be used to yield seven features, where five are from the details, one is from the low-pass residual, and the final is the original image);
- Five shape-index images, one for each of five scales, derived from harmonic second derivatives;
- Gaussian 4-jet at five separate scales.

To further explain the above concepts, the multi-scale representation provided by the wavelet transform may be used to account for the notion that different structures may exist at different scales. Conceptually, the model may learn what to include and what not to include in a reconstruction. The algorithm used to generate the decomposition of the image may be a discrete wavelet transform in which decimation is not carried out. The possible inclusion of Gaussian derivatives is motivated by Taylor's theorem, which states that any smooth (differentiable) function may be represented as a power series where the coefficients only depend on the function's derivatives. Shape is a very powerful means of deducing structure, and to capture shape, one may use harmonic derivatives to measure second-order variations. In one exemplary implementation of an embodiment of the invention, 82 feature images were computed. These techniques may be integrated into an overall process for obtaining virtual bone images (VBIs) and/or VSTIs, as will be further explained below.

The training process may utilize paired DE images that may exhibit data over a broad spectrum of images based on the diversity in their rib appearances. Synthetic nodules may be added to each image at "interesting" points to ensure that the suppression process does not suppress nodules. Manually generated outlines of clavicles and ribs may also be developed and used as part of the training process. As a preprocessing step, images may be normalized for global and/or local contrast to achieve robustness across acquisition devices.

A predictive approach to generate a soft tissue image and/or a bone image may result. The developed technique may use DE cases along with image normalization, image preprocessing, feature extraction, and neural networks to predict a bone image (i.e., a virtual bone image (VBI)), which may be subsequently used to form a VSTI.

Figure 1:
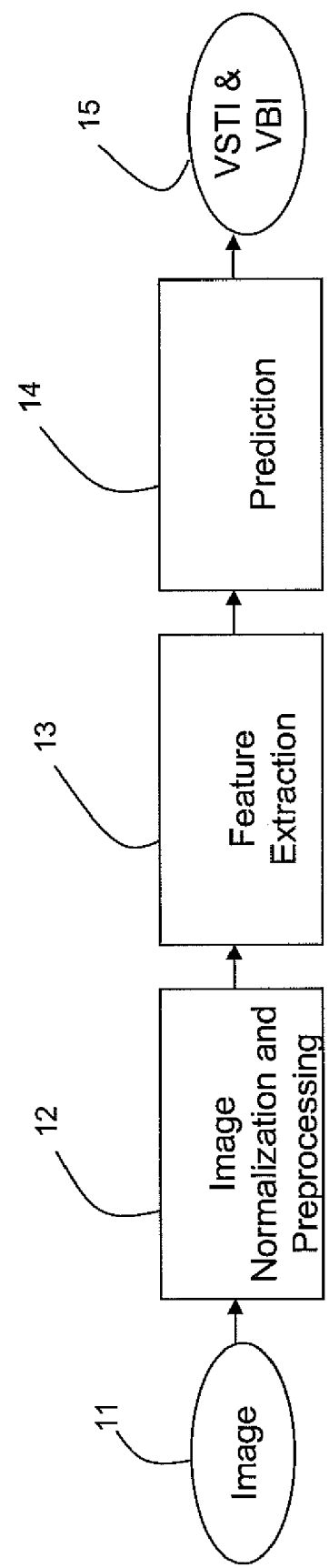
FIG. 1 shows a block diagram/flow diagram of an exemplary embodiment of the invention.
Figure 2:
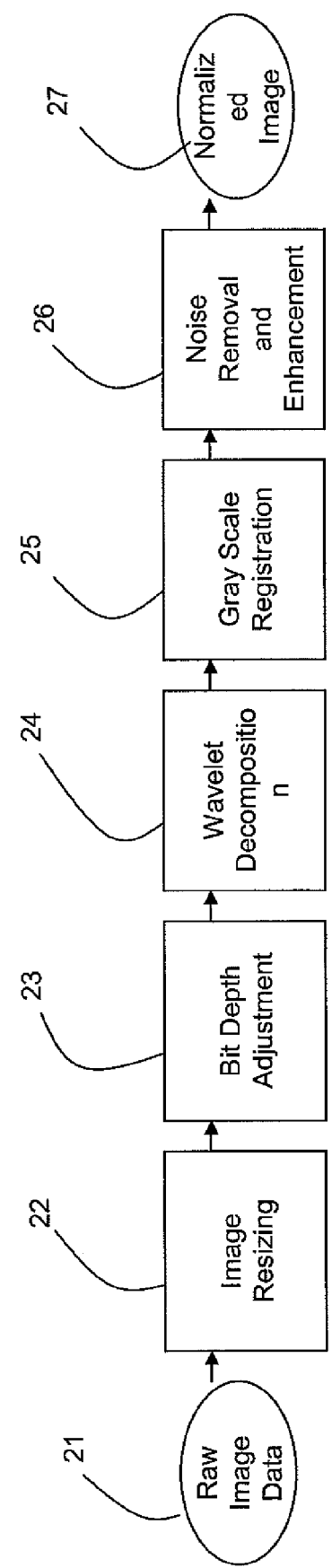
FIG. 2 shows a block diagram/flow diagram of a portion of an exemplary embodiment of the invention.

As can be seen in FIG. 1, the method may begin with the subjecting of an input image 11 to image normalization and pre-processing 12. The image normalization stage 12 may be used to standardize the image across acquisition variables. Image properties, such as bit-depth, spatial resolution, contrast, brightness and sharpness may be considered. FIG. 2 provides a block diagram of an exemplary image normalization and pre-processing approach that may be used in the image normalization and pre-processing 11 of FIG. 1.

Each portion of the illustrated approach may account for particular acquisition factors applied to raw image data 21, for example:

- Image resizing 22: Normalization of spatial resolution (pixel spacing);
- Bit depth adjustment 23: Normalization of gray-level resolution;
- Wavelet decomposition 24: Structure used for subsequent processes;
- Gray scale registration 25: Histogram specification in wavelet space;
- Noise Removal and Enhancement 26: Selective exclusion of wavelet details from the reconstruction process.

The result of the process shown in FIG. 2 may be normalized image data 27.

In image resizing 22, the input image may be re-sampled to a different pixel-spacing size, for example, 0.2 mm. The particular value of 0.2 mm may be used because it is similar to many acquisition sources. In some embodiments of the invention, bilinear interpolation may be used to perform such re-sampling.

The bit depth adjustment 23 may be used to map the input image to a different resolution, for example, the 0-1023 range (10 bits of resolution). During the mapping, for example, the minimum and maximum may be uniquely mapped to 0 and 1023 (however, other mappings may be possible, as well).

The wavelet decomposition 24, gray scale registration 25, and noise removal 26 processes may be carried out jointly, according to various embodiments of the invention. The wavelet decomposition 24 may result in the image resulting from the image resizing 22 and bit depth adjustment 23 being decomposed into a multi-scale wavelet representation. Each wavelet detail may be successively generated and processed for noise removal 26 and gray scale registration 25. In one embodiment of the invention, the only noise removal 26 that occurs may be to leave the first wavelet detail out of the reconstruction. For chest radiographs, this detail may often contain very little information and may be almost entirely noise. In order to register the gray scale values 25, each wavelet detail may be subjected to a histogram specification process. This may be used to map the wavelet details to a target distribution, suppressing and enhancing the overall content at each scale, and may be used to account for variations in contrast, sharpness, and/or brightness, which may thus allow the method to operate across a wide variety of acquisition settings. By successively adding these registered details, a normalized image may be formed. The residual, or coarse part, of the wavelet transform may be kept separate from the normalized part. The normalized image may represent the structural content of the image, while the coarse image may represent the low-frequency content that is typically patient-specific, and which may have no bearing on suppressing bones.

Figure 3:
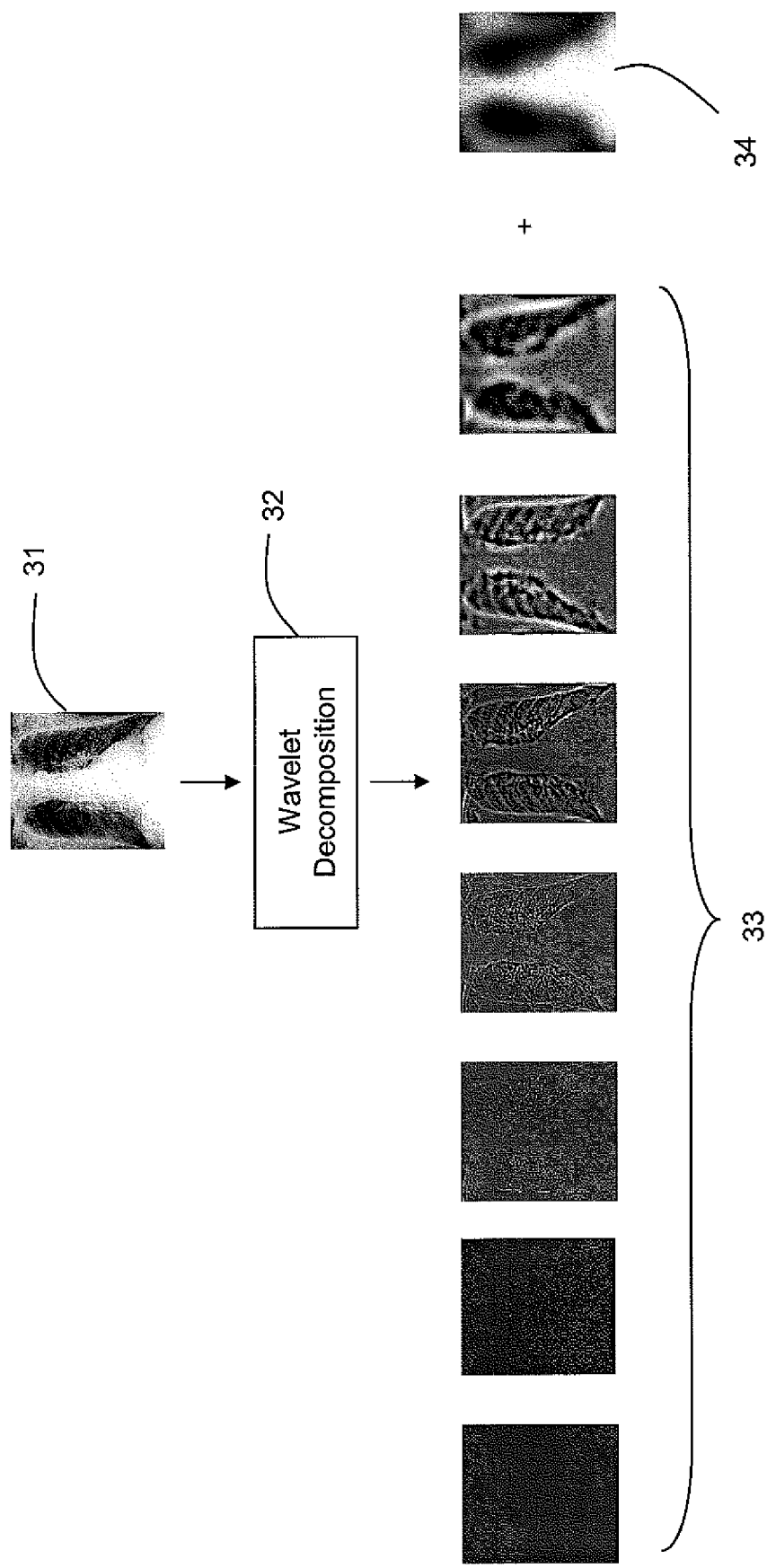
FIG. 3 shows a pictorial representation of processing that may be performed according to some embodiments of the invention.

FIG. 3 illustrates an exemplary image with a set of associated exemplary wavelet components. An image 31 may be subjected to wavelet decomposition 32, resulting in a number of wavelet components 33, 34. The final image 34 of FIG. 3 may represent the coarse residual discussed above.

One may, thereby, obtain two images: one image, the normalized image, may correspond to the reconstructed wavelet details that have been normalized; the other image may correspond to a low-pass residual 34 that may only contain gross global differences in image (this image, while not necessarily being included in all subsequent processes, may be added back at the end to preserve the relative appearance of different areas; it is also noted that this component may be dynamically weighted to thereby provide different degrees of tissue equalization). The normalized image may then be scaled, e.g., to a resolution of 1.2 mm, for use in bone-image estimation. The resealed image may then be further processed (which may be considered as part of the "enhancement" portion of the noise removal and enhancement 26) to account for localized dark areas introduced (or exaggerated) as part of the normalization process 12. Such further processing may include the addition of a Laplacian-of-Gaussians (LoG) image to the image. The LoG image may be clipped and scaled so as not to introduce discontinuities.

Returning to FIG. 1, the next portion of the overall process may comprise feature extraction 13. As discussed above, feature extraction approaches may include techniques using wavelets, harmonics and/or Gaussian derivatives, and/or other techniques for quantifying local shape characteristics. The wavelet used may be a $3^{rd}$-order B-spline, which has a convenient shape and a close relationship with a Gaussian. The harmonic and/or Gaussian derivatives may be computed at multiple scales in order to span the sizes of typical structures.

The feature images that may be obtained using such techniques may then be used as inputs (or, in some embodiments, only the pixels within the lung-field, which includes both the air and opaque sections, may be used) to a set of multi-layer perceptron (MLP) regression models in a prediction phase 14. The outputs of the prediction phase 14 may be averaged to arrive at a final bone estimate for every pixel in the image (pixels outside the lung-field may be set to zero). The predicted low-resolution bone image may subsequently be up-sampled to form the VBI and to obtain a VSTI 15. From a theoretical and computational point of view, the multi-layer perceptron (MLP) may be attractive, as it may be used to model very complicated mappings and may still have a very fast prediction phase 14.

In one exemplary implementation, each neural network may have 82 inputs, 300 hidden nodes, and 5 outputs. The model may be trained to predict the wavelet details (5 outputs), and these predictions may then be summed to form a predicted bone image. Subsequent to that, the bone image may be up-sampled and subtracted from the original PA image. Prior to resizing, the edges within the bone image may be sharpened. The edge sharpening may be done by adding an edge-enhanced image to the bone image. So that noise is not introduced, the edge image may be suppressed (set to zero) in areas where the bone image has insufficient magnitude. This may be accomplished, for example, by producing a crude segmentation of the bone image and using the resulting mask (after possibly being slightly smoothed) to weight the edge image.

In some embodiments of the invention, multiple MLP regression models may be employed. These may be trained to be mutually beneficial and may each predict, for each of a set of pixels of the image, a bone value. These predictions may then be averaged, or otherwise combined, for each pixel, to obtain an averaged or otherwise combined bone value for that pixel (as an example of a non-averaging combination, a technique may be used to select the "best of" the various predictions, according to some user-defined criterion).

The use of multiple models may be applied, for example, on a zonal basis. The use of zonal modeling is discussed, for example, in U.S. Pat. No. 6,549,646, which is incorporated herein by reference. In such instances, one or more regression models may be applied to each of a number of zones to obtain bone values for the pixels of the particular zone. This may permit the regression models to be tailored to the particular zones. As above, if multiple regression models are applied to a particular zone, their predictions may be averaged or otherwise combined.

A VSTI may be obtained by subtracting a predicted VBI from the resolution-enhanced normalized image (obtained by the image normalization and pre-processing, described above). The resulting VSTI may also be mapped back to the original bit depth. In some cases, inverted images may be used in the above processing, and if so, the resulting VSTI may then be inverted.

One practical aspect of the prediction model is to ensure that it does not distort or remove nodules (or any localized pattern that is not attributable to bone). This may be achieved (or at least improved) by using simulated nodules. Simulated nodules may be added to the PA images and the target soft-tissue images. This may be used to provide a prediction model with more representative samples (pixels) that are to be modified in a distinctly different way.

While the techniques described above have been described in the context of bone suppression in radiographic images (and particularly, in chest images, for the purpose of detecting possible lung nodules), these techniques may be more generally applied. In particular, these techniques may be generally applicable to scenarios in which desired objects in images are obscured or camouflaged. This may be done for scenarios in which it is possible to obtain or approximate images with and without the obscurant object(s), in order to be able to train the process. For example, it may be useful in the processing of non-radiographic images, portions of video images, etc., to detect the presence of various types of objects. Such techniques may be valuable, for example, in detecting changes in still and/or video images, for example.

Figure 4:
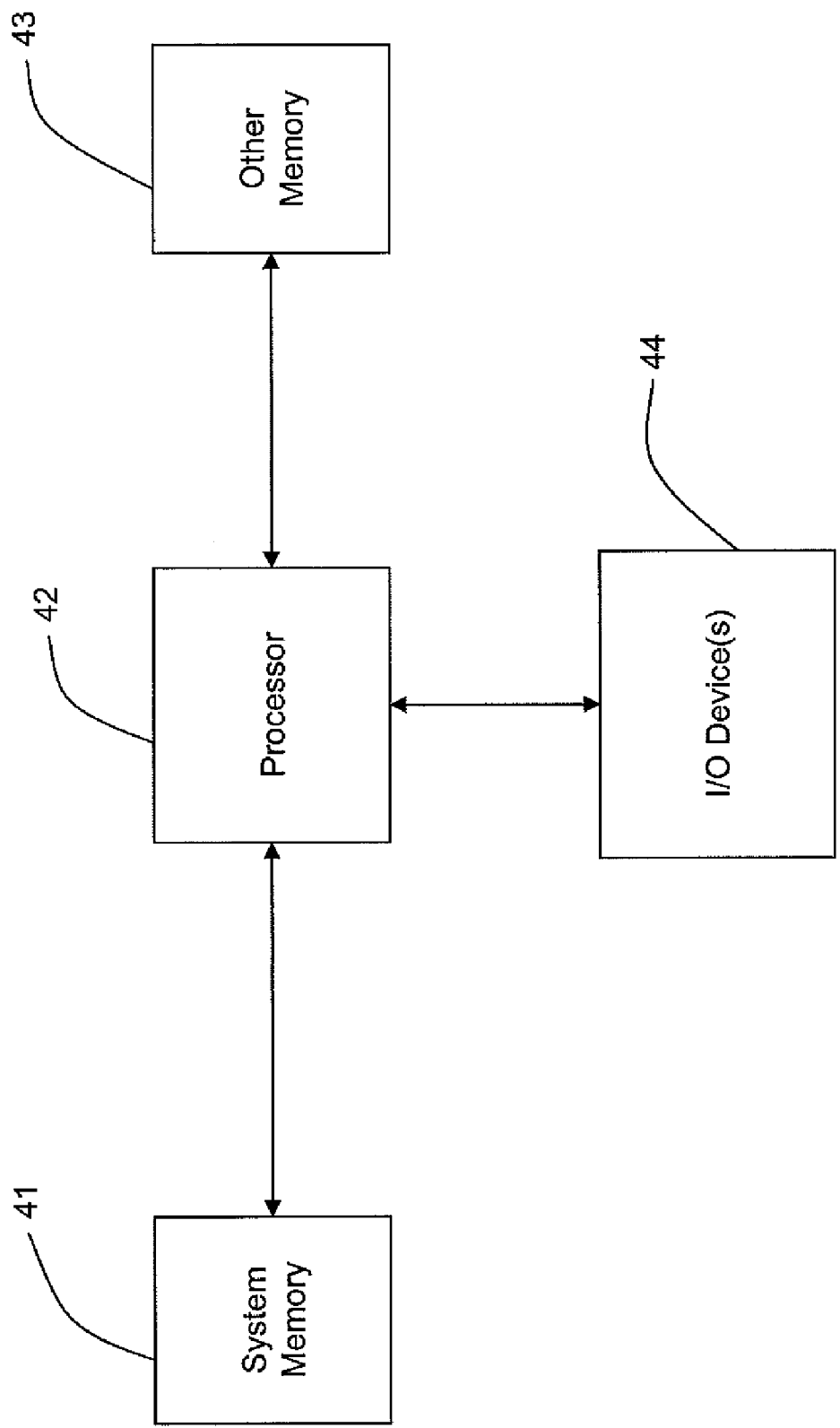
FIG. 4 shows a block diagram of a system that may be used in the implementation of some embodiments of the invention.

Various embodiments of the invention may comprise hardware, software, and/or firmware. FIG. 4 shows an exemplary system that may be used to implement various forms and/or portions of embodiments of the invention. Such a computing system may include one or more processors 42, which may be coupled to one or more system memories 41. Such system memory 41 may include, for example, RAM, ROM, or other such machine-readable media, and system memory 41 may be used to incorporate, for example, a basic I/O system (BIOS), operating system, instructions for execution by processor 42, etc. The system may also include further memory 43, such as additional RAM, ROM, hard disk drives, or other machine-readable storage media. Processor 42 may also be coupled to at least one input/output (I/O) interface 44. I/O interface 44 may include one or more user interfaces, as well as readers for various types of storage media and/or connections to one or more communication networks (e.g., communication interfaces and/or modems), from which, for example, software code may be obtained, e.g., by downloading such software from a computer over a communication network. Furthermore, other devices/media may also be coupled to and/or interact with the system shown in FIG. 4.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

What is claimed is:

1. A method of obtaining one or more image components from an image, the method comprising:
    normalizing and pre-processing the image to obtain a processed image;

extracting features from the processed image to obtain a set of extracted features; and performing neural-network-based regression based on the set of extracted features to predict the one or more image components.

2. The method of claim 1, further comprising:

subtracting the one or more image components from the image to obtain an image with the one or more image components removed.

3. The method of claim 2, further comprising performing a computer-aided detection (CAD) operation on the image with the one or more image components removed.

4. The method of claim 1, wherein the image comprises a radiographic image, and wherein the one or more image components comprise one or more bone structures.

5. The method of claim 1, wherein said normalizing and pre-processing includes:

performing a wavelet decomposition on a normalized image.

6. The method of claim 5, wherein said normalizing and pre-processing includes:

image resizing to obtain a resized image; and bit depth adjustment of the resized image to obtain said normalized image.

7. The method of claim 5, wherein said normalizing and pre-processing further comprises:

performing at least one operation on at least one result of said wavelet decomposition, wherein the at least one operation is selected from the group consisting of: gray scale registration; and noise removal and enhancement.

8. The method of claim 5, wherein said performing a wavelet decomposition results in a set of wavelet components that includes a coarse residual component comprising low-frequency information.

9. The method of claim 8, wherein said normalization and pre-processing further comprises:

performing, on said set of wavelet components, except for the coarse residual component, at least one operation selected from the group consisting of: gray scale registration; and noise removal and enhancement.

10. The method of claim 8, wherein said normalization and pre-processing further comprises:

dynamically weighting the coarse residual component.

11. The method of claim 5, wherein said wavelet decomposition comprises a five-scale wavelet decomposition using a third-order basic spline wavelet.

12. The method of claim 11, further comprising:

obtaining shape-index images for each of the five scales.

13. The method of claim 11, wherein said extracting features includes:

obtaining Gaussian 4-jets at the five scales.

14. The method of claim 1, wherein said performing neural-network-based regression comprises:

applying multiple regression models to obtain multiple bone value predictions for one or more image pixels; and combining the multiple bone value predictions to obtain a combined bone value.

15. The method of claim 14, wherein said combined bone value is obtained by averaging the multiple bone value predictions.

16. The method of claim 1, wherein said performing neural-network-based regression comprises:

applying multiple regression models corresponding to multiple image zones to obtain bone value predictions for the pixels of the multiple image zones.

17. The method of claim 1, further comprising:

downloading software instructions to implement said normalizing and pre-processing, said extracting features, and said performing neural-network-based regression.

18. A machine-readable storage medium containing instructions that, upon execution by a processor, cause the processor to implement a method of obtaining one or more image components from an image, the method comprising:

normalizing and pre-processing the image to obtain a processed image;

extracting features from the processed image to obtain a set of extracted features; and performing neural-network-based regression based on the set of extracted features to predict the one or more image components.

19. The medium of claim 18, wherein the method further comprises:

subtracting the one or more image components from the image to obtain an image with the one or more image components removed.

20. The medium of claim 19, wherein the method further comprises performing a computer-aided detection (CAD) operation on the image with the one or more image components removed.

21. The medium of claim 18, wherein the image comprises a radiographic image, and wherein the one or more image components comprise one or more bone structures.

22. The medium of claim 18, wherein said normalizing and pre-processing includes:

performing a wavelet decomposition on a normalized image.

23. The medium of claim 22, wherein said normalizing and pre-processing includes:

image resizing to obtain a resized image; and bit depth adjustment of the resized image to obtain said normalized image.

24. The medium of claim 22, wherein said normalizing and pre-processing further comprises:

performing at least one operation on at least one result of said wavelet decomposition, wherein the at least one operation is selected from the group consisting of: gray scale registration; and noise removal and enhancement.

25. The medium of claim 22, wherein said performing a wavelet decomposition results in a set of wavelet components that includes a coarse residual component comprising low-frequency information.

26. The medium of claim 25, wherein said normalization and pre-processing further comprises:

performing, on said set of wavelet components, except for the coarse residual component, at least one operation selected from the group consisting of: gray scale registration; and noise removal and enhancement.

27. The medium of claim 25, wherein said normalization and pre-processing further comprises:

dynamically weighting the coarse residual component.

28. The medium of claim 22, wherein said wavelet decomposition comprises a five-scale wavelet decomposition using a third-order basic spline wavelet.

29. The medium of claim 28, wherein the method further comprises:

obtaining shape-index images for each of the five scales.

30. The medium of claim 28, wherein said extracting features includes:

obtaining Gaussian 4-jets at the five scales.

31. The medium of claim 18, wherein said performing neural-network-based regression comprises:

applying multiple regression models to obtain multiple bone value predictions for one or more image pixels; and combining the multiple bone value predictions to obtain a combined bone value.

32. The medium of claim 31, wherein said combined bone value is obtained by averaging the multiple bone value predictions.

33. The medium of claim 18, wherein said performing neural-network-based regression comprises:

applying multiple regression models corresponding to multiple image zones to obtain bone value predictions for the pixels of the multiple image zones.

34. An apparatus for obtaining one or more image components from an image, comprising:

means for normalizing and pre-processing the image to obtain a processed image;

means for extracting features from the processed image to obtain a set of extracted features; and means for performing neural-network-based regression based on the set of extracted features to predict the one or more image components.

35. The apparatus of claim 34, further comprising:

means for subtracting the one or more image components from the image to obtain an image with the one or more components removed.

36. The apparatus of claim 35, further comprising:

means for performing a computer-aided detection (CAD) operation on the image with the one or more image components removed.

37. The apparatus of claim 34, wherein the image comprises a radiographic image, and wherein the one or more image components comprise one or more bone structures.

38. The apparatus of claim 34, wherein said means for normalizing and pre-processing includes:

means for performing a wavelet decomposition on a normalized image.

39. The apparatus of claim 38, wherein said means for normalizing and pre-processing includes:

means for image resizing to obtain a resized image; and means for bit depth adjustment of the resized image to obtain said normalized image.

40. The apparatus of claim 38, wherein said means for normalizing and pre-processing further comprises:

means for performing at least one operation on at least one result of said wavelet decomposition, wherein the at least one operation is selected from the group consisting of: gray scale registration; and noise removal and enhancement.

41. The apparatus of claim 38, wherein said means for performing a wavelet decomposition results in a set of wavelet components that includes a coarse residual component comprising low-frequency information.

42. The apparatus of claim 41, wherein said means for normalization and pre-processing further comprises:

means for performing, on said set of wavelet components, except for the coarse residual component, at least one operation selected from the group consisting of: gray scale registration;

and noise removal and enhancement.

43. The apparatus of claim 41, wherein said means for normalization and pre-processing further comprising:

means for dynamically weighting the coarse residual component.

44. The apparatus of claim 38, wherein said wavelet decomposition comprises a five-scale wavelet decomposition using a third-order basic spline wavelet.

45. The apparatus of claim 44, further comprising:

means for obtaining shape-index images for each of the five scales.

46. The apparatus of claim 44, wherein said means for extracting features includes:

means for obtaining Gaussian 4-jets at the five scales.

47. The apparatus of claim 34, wherein said means for performing neural-network-based regression comprises:

means for applying multiple regression models to obtain multiple bone value predictions for one or more image pixels; and means for combining the multiple bone value predictions to obtain a combined bone value.

48. The apparatus of claim 47, wherein said combined bone value is obtained by averaging the multiple bone value predictions.

49. The apparatus of claim 34, wherein said means for performing neural-network-based regression comprises:

means for applying multiple regression models corresponding to multiple image zones to obtain bone value predictions for the pixels of the multiple image zones.

* * * * *